United States Patent [19]

Quante et al.

[11] Patent Number: 5,285,813
[45] Date of Patent: Feb. 15, 1994

[54] PRESSURE LIMITING VALVE WITH STABLE SPRING PAD

[75] Inventors: Norbert Quante, Dorsten; Heinrich Quante, Recklinghausen, both of Fed. Rep. of Germany

[73] Assignee: Ingenieurtechnik GmbH & Co. KG, Rechlinghausen, Fed. Rep. of Germany

[21] Appl. No.: 930,413

[22] PCT Filed: Feb. 14, 1991

[86] PCT No.: PCT/DE91/00112

§ 371 Date: Sep. 17, 1992

§ 102(e) Date: Sep. 17, 1992

[87] PCT Pub. No.: WO91/13280

PCT Pub. Date: Sep. 5, 1991

[30] Foreign Application Priority Data

Feb. 22, 1990 [DE] Fed. Rep. of Germany ......... 283922

[51] Int. Cl.$^5$ ...................... F16K 15/06; F16K 17/04
[52] U.S. Cl. ................... 137/494; 137/512.3; 137/538; 251/337
[58] Field of Search ............ 137/494, 538, 512, 512.3; 251/337

[56] References Cited

U.S. PATENT DOCUMENTS

| | | | |
|---|---|---|---|
| 2,287,840 | 6/1942 | Stratton | 137/538 X |
| 3,057,374 | 10/1962 | Gondek | 137/538 |
| 3,482,415 | 12/1969 | Trask | 137/538 X |
| 3,482,594 | 12/1969 | Simon | 137/538 |
| 3,548,867 | 12/1970 | Grisebach et al. | 137/494 |
| 4,274,435 | 6/1981 | Block | 137/538 X |
| 4,313,463 | 2/1982 | Weirich | 137/538 |
| 4,552,172 | 11/1985 | Krieger et al. | 137/494 X |
| 4,716,928 | 1/1988 | Kussel et al. | 137/494 |
| 4,790,347 | 12/1988 | Weirich et al. | 137/494 X |

FOREIGN PATENT DOCUMENTS

| | | |
|---|---|---|
| 1303157 | 1/1973 | Fed. Rep. of Germany . |
| 3314837 | 12/1983 | Fed. Rep. of Germany . |
| 3444636 | 6/1986 | Fed. Rep. of Germany . |
| 3830075 | 6/1989 | Fed. Rep. of Germany . |
| 0687241 | 10/1979 | U.S.S.R. ............................ 137/538 |

*Primary Examiner*—John Rivell
*Attorney, Agent, or Firm*—James C. Wray

[57] ABSTRACT

A pressure limiting valve has a piston sliding inside a piston bore in a piston guide. A valve spring and a spring plate move in a spring sleeve which has an adjusting screw at an end opposite the spring plate. The spring plate has flow-through openings. The piston extends into a blind bore in the spring plate. The piston guide, which forms the bottom of the spring chamber, has a funnel-shaped recess which extends to the inside wall of the spring sleeve. The spring plate support surface for the valve spring is below the top of the piston.

21 Claims, 4 Drawing Sheets

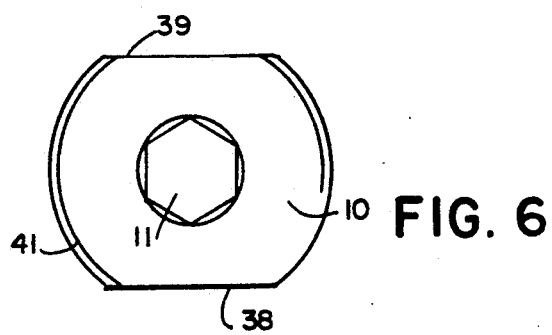
FIG. 6
FIG. 7
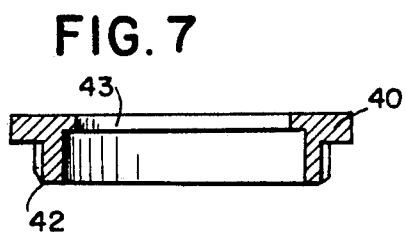
FIG. 9
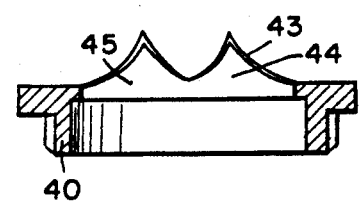
FIG. 8
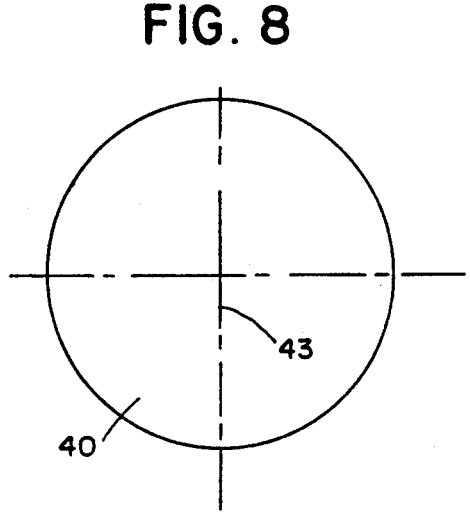
FIG. 10
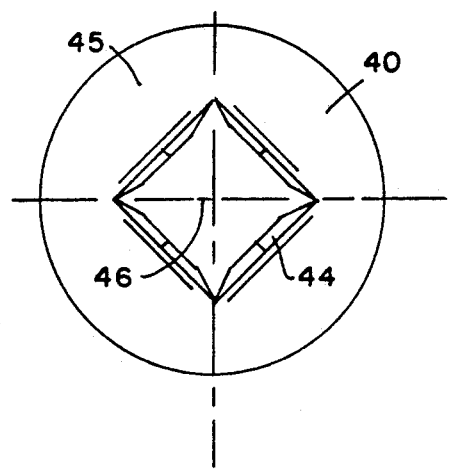

PRESSURE LIMITING VALVE WITH STABLE SPRING PAD

The invention relates to a pressure limiting valve.

Such pressure limiting valves are used especially in underground mining to effectively protect hydraulic systems from sudden overloads, e.g. due to a sudden sagging or rock burst. The sudden bursts may overload the individual prop or even the entire system in such a way that permanent damage or even destruction occurs. The pressure limiting valves prevent this by opening and releasing pressure fluid in response to a sudden overload.

German OLS 28 30 891 proposes a safety valve where excess pressures may be reduced in the system via a valve spring suspended between a screw plug and valve piston. Hereby a cone-shaped closing element which is lifted from the valve seat if an overload occurs is connected to the valve plate. A throttle cylinder which limits the flow-through opening is connected to the valve closure piston. Such valve closures do not have the necessary closing safety. In addition, a different design of the spring may result in a different function of such pressure limiting valves.

The pressure limiting valve proposed in German 33 14 837 has a valve case which is closed with a cover and which holds the valve spring itself. The valve spring loads the valve piston which is guided in a sliding manner in the piston guiding portion inside the piston bore constructed there. The bore holding the valve piston has a groove holding an O-ring which ensures the necessary seal. The radial bores must move completely past the O-ring in the valve piston in order to ensure flawless opening of the valve and to attain long life spans for the O-ring seal. At the level of the valve plate are exit bores through which the pressure medium is discharged when the valve responds. A disadvantage here is that the pressure medium must be deflected several times to make it exit from the pressure limiting valve. For this reason, and also because of uneven support of the spring plate, the valve plate flutters and the valve spring rests against the inside wall of the spring sleeve.

German Patent 35 08 986 describes a valve where proficient guidance of the pressure medium inside the pressure limiting valve results in a protection of internal parts and greater flow-through volume. The spring plate is angled on its underside and there are channels in the inside wall of the spring sleeve through which the pressure medium may be guided past the valve spring, whereupon it then is passed after all through the spring into the flow-through opening of the adjusting screw and from there is discharged into the atmosphere. The disadvantage here is that the pressure medium still must flow past the spring plate, influence it, and possibly contribute to an angling of the spring plate so that the valve spring is loaded unevenly.

SUMMARY OF THE INVENTION

The invention is based on the task of creating a pressure limiting valve which is constructed so as to maintain a favorable flow and to enable a high flow-through volume. According to the invention this task is solved.

In a pressure limiting valve constructed in this manner, the pressure medium may be passed advantageously near or finally even through the spring plate when the valve responds, without being deflected too much. In addition, the piston is positioned so far in the spring plate, i.e. in the blind bore constructed there, that a much more stable position of the system is achieved and the force application is therefore improved. Angling of the spring and even bulging may be safely prevented in this way. Finally, by constructing the spring sleeve with a corresponding funnel-shaped recess, a path which promotes an advantageous flow is provided for the pressure medium when the O-ring is passed over. This funnel-shaped recess starts right above the O-ring so that the pressure medium then still may exit in the correct direction, i.e. radially, in order to be passed along the funnel walls in the direction of the internal chamber of the spring sleeve.

According to a useful construction of the invention, provisions are made that the spring plate produces a support surface for the valve spring and a stop surface for the piston when seen from over the level of the spring plate, they are distanced so that the support surface is close to the piston guiding portion and the stop surface is close to the adjusting screw. Since the force application point of the spring is located below the counterforce application point of the piston on the spring plate, a buckling is practically impossible. An even flow through the spring chamber is ensured in that the adjusting screw has in addition to the through-bore, two segment-like openings which are constructed so as to face each other. In this way, the hydraulic fluid may pass speedily past the valve casing.

A favorable force application of the spring plate on the piston and a favorable position of this piston is ensured according to the invention by constructing the blind holes in the spring plate so that they hold 15 to 25%, preferably 20% of the piston. Thus the piston is held by one fifth of its length in the spring plate, thus resulting in the described smooth guidance of the piston.

By reducing the support surface of the piston in the spring plate, this articulation between piston and spring plate is improved. This is especially achieved in that the blind bore has a semi-spherical end, and the piston has a corresponding rounded cone tip. This measure is technically limited only by the pressure resistance of the materials of spring plate and piston which act on each other. Accordingly, another optimization consists of having the acute angles of the cone tip diverging slightly from each other, whereby the closure becomes more acute, i.e. sharper. An optimum articulation between piston and spring plate is achieved in this way.

It is possible to form channels of almost any volume below the spring plate by equipping the spring plate on the underside with a bead which projects into the recess, whereby the bead is smaller than the recess itself. These curved channels hereby also open on the exit side so that sufficient volumes of pressure medium may be discharged quickly. Since the channels are first constructed exactly in the direction of the radial bores of the piston, the pressure medium is admitted without further deflection and is then transported continuously via the funnel-shaped recess to the inside wall of the spring sleeve, resulting in an even volume stream. An especially advantageous guidance of the pressure medium is achieved if the recess is a second order area and has a parabolic, hyperbolic, or elliptical shape. In this way, the discharged fluid or pressure medium is deflected in a controlled manner and is passed very evenly into the spring chamber. It must be pointed out again at this point that the pressure medium in such a construction is quasi guided out from the radial bores and is deflected in such a way that there are practically no pressure losses.

Other improvements are to be expected if the rotation paraboloid forming the recess has a cylinder as rotation center, whereby the parabola rotates on the exterior surface of a theoretical piston which essentially corresponds to the piston. In this way the system of the spot light is appropriated for a flowing pressure medium, resulting in the advantages already described above.

When the pressure limiting valve responds, a large volume of pressure medium flows into the spring chamber within a brief time. In order to avoid a back-up here, the invention provides that the spring sleeve has radially positioned exit bores near the adjusting screw. In this way the pressure medium is able to simultaneously pass through the through-bore in the adjusting screw and through the described exit bores which are constructed in the spring sleeve in a suitable number.

Such pressure limiting valves may be used advantageously also in individual prop valves, whereby optimum protection is achieved by constructing the spring sleeve so as to surround the adjusting screw spherically, whereby an exit bore corresponding to the through-bore is provided. This provides an even force application, thus preventing chips and/or nicks. In addition, this measure protects the adjusting screw for the spring pressure and is not accessible from the outside, or is accessible only if so desired. This special construction of the spring sleeve also provides an even external surface in all cases, even if the adjusting screw should be screwed in extremely deep.

According to a useful construction of the invention it is provided that the spring plate has a rectangular or triangular cross-section. Such a construction of the spring plate creates the advantageous flow-through openings necessary and distributed over the circumference, so that this also ensures a stable position of the spring plate if the flow-through values are favorable.

The flow-through openings may be specifically increased by equipping the angular spring plate with protrusions directed to the center of the spring plate. Hereby these beads also may be equipped with angled walls, resulting in an even better guidance of the pressure medium when the valve responds.

Instead of the spring sleeve which is closed towards the top, it is also possible to provide a continuous opening in which the adjusting screw may be moved back and forth via a thread. It is useful if the adjustable screw produces an internal thread, in which a synthetic protective screw plug has a corresponding thread and can be screwed in via a centered cross recess.

In order to make installation of the valve faster and safer, it is provided that the spring sleeve and the piston guiding portion connected tightly together via a stop closure. This eliminates the need for the external and internal thread for spring sleeve and piston guide. Rather, it is only necessary to provide suitable spaces for the snap closure in both parts, whereby it is regarded as particularly advantageous if the stop closure is formed by a seal ring and a corresponding groove-shaped primary recess, as well as a second recess in the piston guide position that is close to the first recess. In the closed condition, the seal is halfway in the first recess, and the second recess, which is bevelled off the first, is introduced. The two parts, i.e. the spring sleeve and the piston guide, may in this way be clamped or connected easily to each other, or also may be pulled apart, i.e. if the two parts are pushed or pulled into or out of each other in such a way that the closure ring falls into the correspondingly sized recess.

The invention is characterized especially in that the special construction of the spring plate and the piston guide with the funnel-shaped recess ensures a favorable guidance of the pressure medium when the pressure limiting valve responds. This pressure medium is already accepted and guided in a controlled manner when it leaves the radial bores of the piston, is passed quasi through the valve plate and may then penetrate into the spring chamber, whereupon it exits via the through-bore and the exit bores into the atmosphere after the spring chamber is filled. In the process, the pressure medium impacts the spring plate at the edges, whereby the spring plate is however still positioned safely and ensures even force transfer since the spring plate has a corresponding recess in which it may safely hold and guide the piston. Because of the favorable guidance of the pressure medium and the special construction of the pressure limiting valve, flow-through volumes of 100 l and more may be achieved.

Other details and advantages of the object of this invention are found in the following description of the pertinent drawing which depicts a preferred embodiment with the necessary details and individual parts.

BRIEF DESCRIPTION OF THE DRAWINGS

FIG. 6 shows a top view of the adjusting screw, FIG. 7 shows a lateral view of a protective screw plug, FIG. 8 shows a top view of the closed protective screw plug, FIG. 9 shows a lateral view of the open protective screw plug, FIG. 10 shows a top view of the open protective screw plug.

DETAILED DESCRIPTION OF THE DRAWINGS

Figure 1:
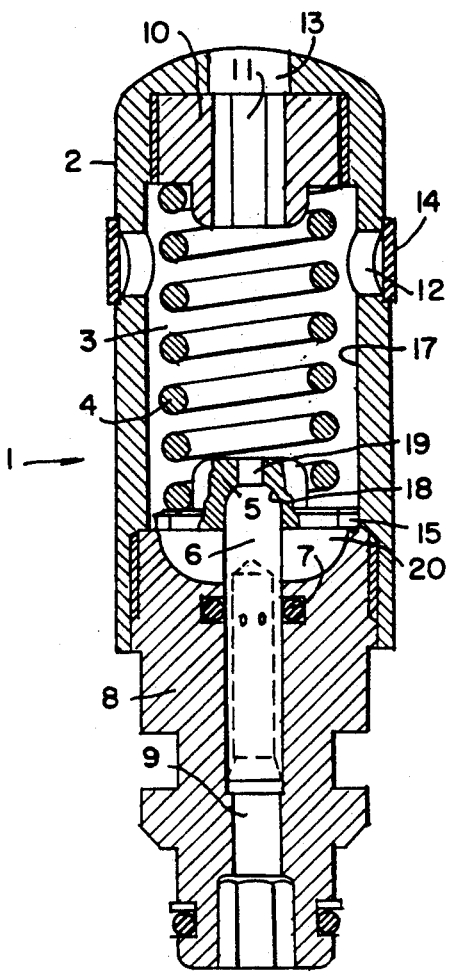
FIG. 1 shows a longitudinal section of a pressure limiting valve in accordance with the invention with parabolic recess in the piston guide.

The pressure limiting valve (1) seen in FIG. 1 consists of the spring sleeve (2) in whose spring chamber (3) is located a valve spring (4). This valve spring (4) is supported both by the lower spring plate (5) so that the piston is fixed accordingly in the piston bore (9), and by the adjusting screw (10). The piston bore (9) is constructed in the piston guiding portion (8), whereby this piston bore (9) has a groove holding an O-ring (7) for sealing purposes.

The adjusting screw (10) has a through-bore which allows, firstly, for adjustment of the adjusting screw (10) itself to change the pressure of the valve spring (4) and, secondly, through which the pressure medium may exit when the valve responds. In addition, exit bores

(12) are arranged radially in order to prevent a back-up into the spring chamber (3). These radial exit bores (12) are covered by a dust seal (14), in the form of a rubber ring. The use of a spring ring or similar sealing elements is also conceivable.

(13) stands for the exit bore in the spring sleeve (2) which is necessary for operating the adjusting screw (10) and for then removing the pressure medium which has passed the through-bore (11) from the area of the spring sleeve (2).

Figure 3:
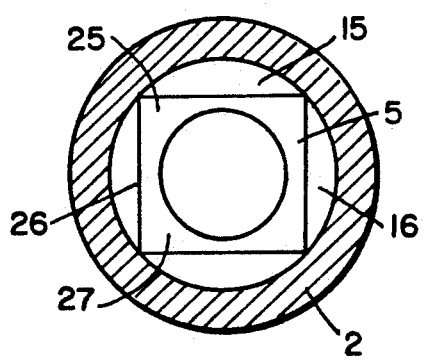
FIG. 3 shows a section through the pressure limiting valve according to FIG. 2 with spring plate.
Figure 4:
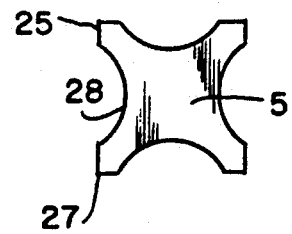
FIG. 4 shows another construction of the spring plate.

The spring plate (5) has flow-through openings (15,16) which are described in more detail in FIG. 3 and 4. These flow-through openings ensure that the pressure medium is able to flow along the inside wall (17) through the spring chamber (3) after passing the spring plate (5).

The spring plate (5) is equipped with a blind bore (18) which is deep enough to hold approx. 20% of the piston (6). The high plunging depth of the piston (6) into the spring plate (5) results in a more stable position of the system, thus improving the force application on the piston. This safely prevents angling of the spring or bulging.

Figure 2:
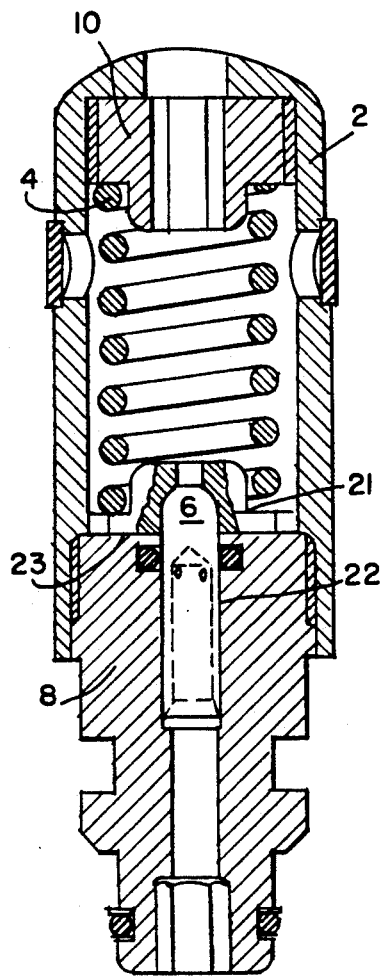
FIG. 2 shows a section without corresponding recess in accordance with the invention in the guide, but with a piston plunged deeply into the spring plate.

The bore holding the piston (6) is constructed as a combined blind and stepped bore (18,19), whereby the piston is supposed to plunge into the spring plate (5) far beyond the attachment point (21) of the straight sides (22). FIG. 2 shows a corresponding construction.

Figure 5:
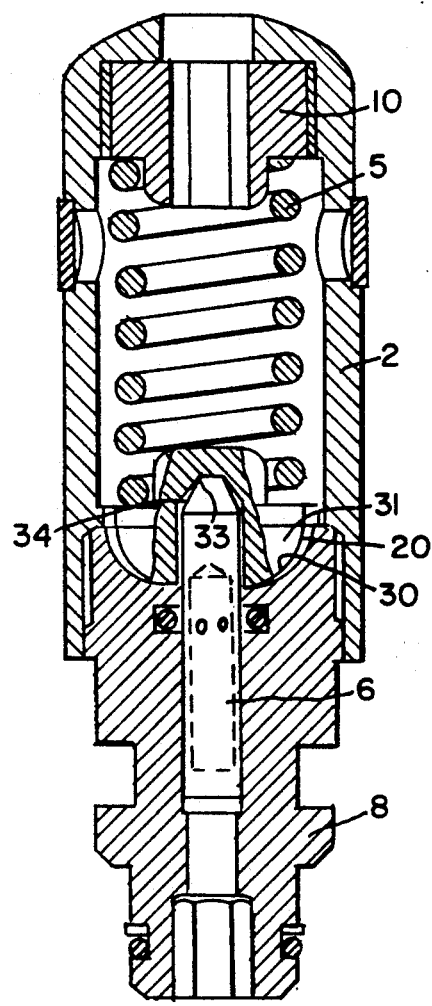
FIG. 5 shows a section through a pressure limiting valve where the spring plate has a bead projecting into the recess.

While according to FIG. 2 the area (23) forming the bottom of the spring chamber (3) is straight so that the pressure medium here must be deflected very disadvantageously in the area of the transition from spring plate (5) to spring chamber (3), FIG. 1 and 5 provide a construction where a parabolic recess (20) is located in the area (23). The correspondingly curved recess (20) results in a favorable guidance of the pressure medium after it leaves the radial bores in the piston (6).

FIG. 3 shows a top view onto a spring plate (5) which clarifies that the latter is constructed squarely in such a way that flow-through openings (15,16) are created between the corners (25,27). These flow-through openings additionally may be optimized according to FIG. 4 by equipping the area (26) between the corners (25,27) with a corresponding recessed surface (28), whereby forms different from the one according to FIG. 4 are also conceivable.

FIG. 5 essentially corresponds to FIG. 3, whereby here however a bead (31) is formed at the underside (30) of the spring plate (5) in such a way that it projects correspondingly far into the recess (20). It now forms, together with the areas of the recess (20), a channel system through which the pressure medium is discharged similar to the version according to FIG. 1.

Another difference from FIG. 1 is that here the end (33) of the blind bore (18) and the cone tip (34) have a special shape. The piston (6) is constructed in a cone-shape on the top and is rounded at the cone tip in such a way that the support surface is reduced. The cone-shaped recess with the bead (31) corresponds to the cone tip (34) of the piston (6) in as far as the latter includes a slightly less acute angle in the tip. This improves the articulation between piston (6) and spring plate (5).

This special construction of the pressure limiting valve, especially with the special guidance of the spring plate, makes it possible to use longer springs. Such springs may be produced better with the corresponding characteristic line and have a longer life span. Continuous stress values are also much better.

FIG. 6 shows a top view of an adjusting screw (10), which in addition to the through-bore (11) is equipped with two segment-like openings (38,39) through which the hydraulics fluid may exit to the outside. This adjusting screw (10) is equipped with an adjusting screw thread (41) so that it may be screwed from the top into the spring sleeve (2) in the construction shown in FIG. 1.

FIG. 7, 8, 9, and 10 show a protective screw plug (40) consisting of plastic which, like the adjusting screw (39), may be screwed from the top into the spring sleeve (2). For this purpose the protective screw plug (39) has a thread (42) which corresponds to the adjusting screw thread (41). In the center is a cross slit (43) which has been chosen so that the different flaps (44, 45) prevent dust from penetrating into the spring chamber (3) during normal operation. But if the pressure limiting valve (1) responds, the hydraulic fluid opens the flaps (44,45), bends them outward, creating in this way the opening (46) which is shown in FIG. 9 and 10 and through which the pressure medium may easily escape.

Figure 11:
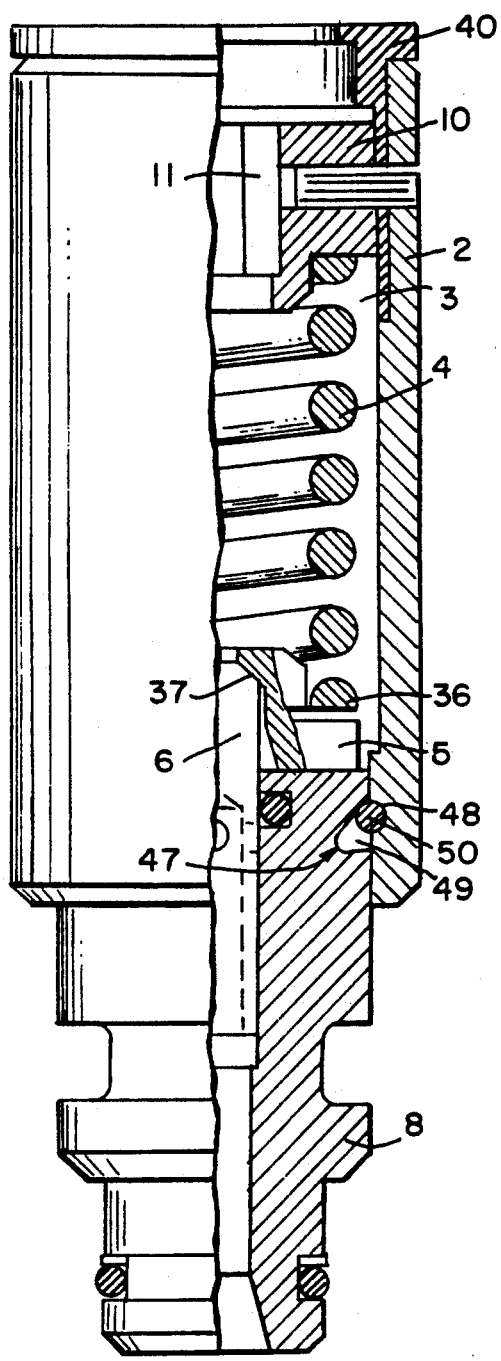
FIG. 11 shows a longitudinal section through a pressure limiting valve with stop closure.

FIG. 11 shows that the support surface (36) of the valve spring (4) is located below the stop surface (37) of the piston (6), thus resulting in an optimum guidance of the valve spring (4). The support surface (36) on the spring plate (5) extends horizontally so that the valve spring (4) is supported securely.

FIG. 11 shows a pressure limiting valve where the spring sleeve (2) and the piston guide (8) are connected to each other via a stop closure (47). This stop closure (47) is formed by providing groove-shaped recesses (48,49) closely on top of each other. The groove-shaped recess (48) which is on top in FIG. 11 is constructed halfway in the piston guide portions (8) and halfway in the spring sleeve (2), while the lower groove-shaped recess is constructed entirely in the piston guide (8). By moving the piston guide portion (8) up against the force of the valve spring accordingly, this makes it possible to push the closure ring (50) into the larger groove-shaped recess (49), whereupon both parts, i.e. spring sleeve (2) and piston guide (8) may be pulled apart without any problems. If the process is reversed, the closure ring (50) slides through downward pressure of the piston guide portion, with the help of the valve spring (4), into the divided groove-shaped recess (48) when it is pulled down, and both parts are connected to each other effectively. This process is made possible by the upper slant of the recess (49). The closure ring (50) is shown in FIG. 11 in the clamped state.

We claim:

1. A pressure limiting valve comprising a piston guided by an O-ring seal inside a piston bore correlated with a piston guide and secured by a valve spring acting through a spring plate, which are movable in a spring sleeve surrounding the valve spring and the spring plate, an adjusting screw which has a through-bore and which forms an end of the spring chamber opposite the spring plate, characterized in that the spring plate has openings functioning as flow-through openings, the spring plate has a blind bore, the piston has a straight side in the blind bore, and the piston guide in an area forming a bottom of a spring chamber in the spring sleeve has a funnel-shaped recess which extends to an inside lateral wall of the spring chamber.

2. The pressure limiting valve according to claim 1, further characterized in that the spring plate has a support surface for the valve spring and the blind bore has a stop surface for an end of the piston, and wherein the support surface on the spring plate is closer to the piston guide and the stop surface int he blind bore is closer to the adjusting screw.

3. The pressure limiting valve according to claim 1, further characterized int hat the adjusting screw has in addition to the through-bore two segment-like openings which face each other and which extend parallel to the through-bore.

4. The pressure limiting valve according to claim 1, further characterized in that the blind bore in the spring plate holds 15% to 25% of the piston.

5. The pressure limiting valve according to claim 1, further characterized in that the blind bore in the spring plate has a semi-spherical end and the piston has a rounded conical tip.

6. The pressure limiting valve according to claim 5, further characterized int hat the blind bore has a cone-shaped end which has a slightly less acute angle than the conical tip of the piston.

7. The pressure limiting valve according to claim 1, further characterized in that the spring plate has on an underside a bead projecting into the funnel-shaped recess, the bead being smaller than the recess.

8. The pressuring limiting valve according to claim 1, further characterized int hat the recess has a parabolic, hyperbolic or elliptic shape.

9. The pressure limiting valve according to claim 1, further characterized in that the funnel-shaped recess forms a rotation paraboloid which has a cylinder as a rotation center, wherein the parabola rotates about an exterior surface which essentially corresponds to the piston.

10. The pressure limiting valve according to claim 1, further characterized in that the spring sleeve has radially arranged exit bores provided inside near the adjusting screw.

11. The pressure limiting valve according to claim 1, further characterized in that the spring sleeve surrounds the adjusting screw spherically, and an exit bore corresponding to the through-bore is provided in the spring sleeve.

12. The pressure limiting valve according to claim 1, further characterized in that the spring plate has a square or triangular cross-section.

13. The pressure limiting valve according to claim 1, further characterized int hat the spring plate has corners, and surfaces between the corners of the spring plate extended inward.

14. The pressure limiting valve according to claim 1, further characterized in that an end of the spring sleeve holding the adjusting screw is closed with as plastic protective screw plug which has a thread corresponding to a thread of the adjusting screw and which has a cross-slit in a center of the plug.

15. The pressure limiting valve according to claim 1, further characterized in that the spring sleeve and the piston guide are connected via a quick-connection closure.

16. The pressure limiting valve according to claim 15, further characterized in that the closure is formed by two groove-shaped recesses constructed at a distance from each other in longitudinal direction of the valve, of which one recess is in the piston guide and the other recess is in the spring sleeve.

17. The pressure limiting valve according to claim 1, further characterized in that the blind bore is a stepped bore having a shoulder end engaged by an end of the piston.

18. A pressure limiting valve having a piston guide, a piston bore in the piston guide, and a piston slidable in the piston bore, a spring sleeve connected to the piston guide, a valve spring mounted in the spring sleeve and a spring plate mounted int he spring sleeve between one end of the spring and an end of the piston, the spring plate having a central bore for receiving one end of the piston, and the piston extending into the central bore for a substantial distance and abutting an end of the central bore, the spring plate having a spring end support surface which contacts the end of the spring, the spring support surface being positioned closer to an end of the piston guide, and the end of the piston in the central bore being positioned relatively further from the end of the piston guide, the piston having a cylindrical wall extending into the central bore in the spring plate for stabilizing the spring plate as the piston moves the spring plate and spring in the spring sleeve.

19. The apparatus of claim 18, wherein the spring sleeve has internal threads at an end opposite the spring plate, wherein the spring sleeve extends inward beyond the thread, and an adjusting screw mounted in the threads and accessible through an opening in the inward-extending end of the spring sleeve for adjusting the adjusting screw through the opening in the spring sleeve end.

20. The apparatus of claim 18, wherein the spring sleeve has internal threads at an end opposite the spring plate, wherein the spring sleeve extends inward beyond the thread, and an adjusting screw mounted in the threads, an adjusting screw mounted in the threads for contacting an end of the spring remote from the spring plate, the adjusting screw having a through opening, a threaded plug mounted in the threads beyond the adjusting screw, the plug having a relatively thin, flexible central area having a cross-slit for allowing the central area to bend and form flaps on flow of fluid out through the spring sleeve, a relatively large circumferential recess in an outer wall of the piston guide, and a relatively small circumferential recess in an inner wall of the spring sleeve, a resilient expandable ring held int he circumferential recess of the piston guide, and partially extendable into the circumferential inner recess in the spring sleeve for permitting push-on assembly of the spring sleeve on the piston guide, and for locking the spring sleeve in place on the piston guide.

21. The pressure limiting valve of claim 18, wherein an end of the piston guide near the spring plate has a parabolic recess, and wherein the spring plate has portions which extend into the recess, wherein the spring plate is angular in plan form and has recessed outer surface for admitting flow of fluid past the spring plate, and wherein an end of the piston is conical and an end of the central bore is conical and has a greater slope than a slope of the conical end of the piston for forming a space between the conical end of the piston and the conical end of the central bore.

* * * * *